Dec. 1, 1964   J. J. HAVLIK   3,158,905
MECHANICAL INJECTION MOLDING MACHINE
Filed Jan. 19, 1962   5 Sheets-Sheet 5

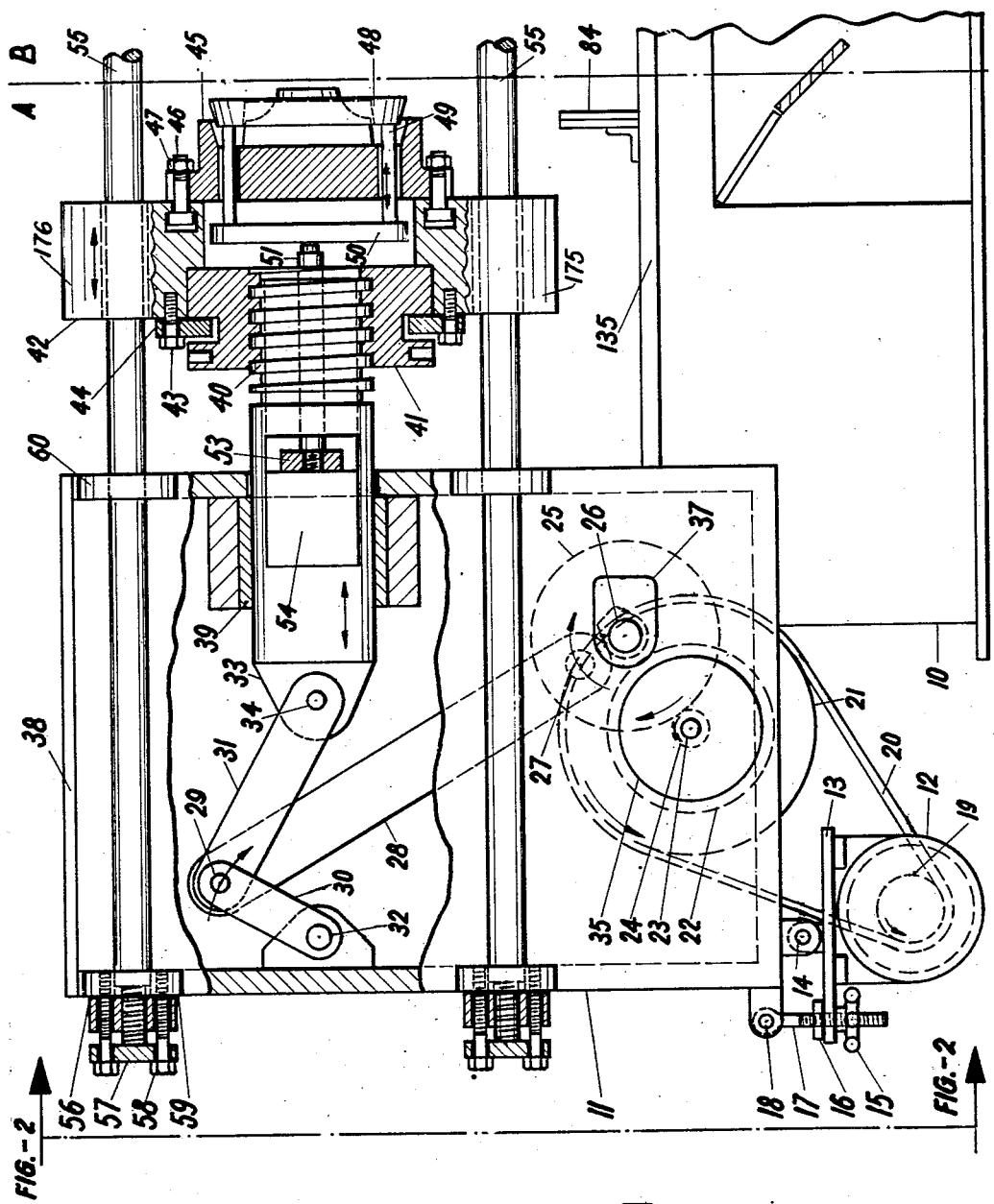

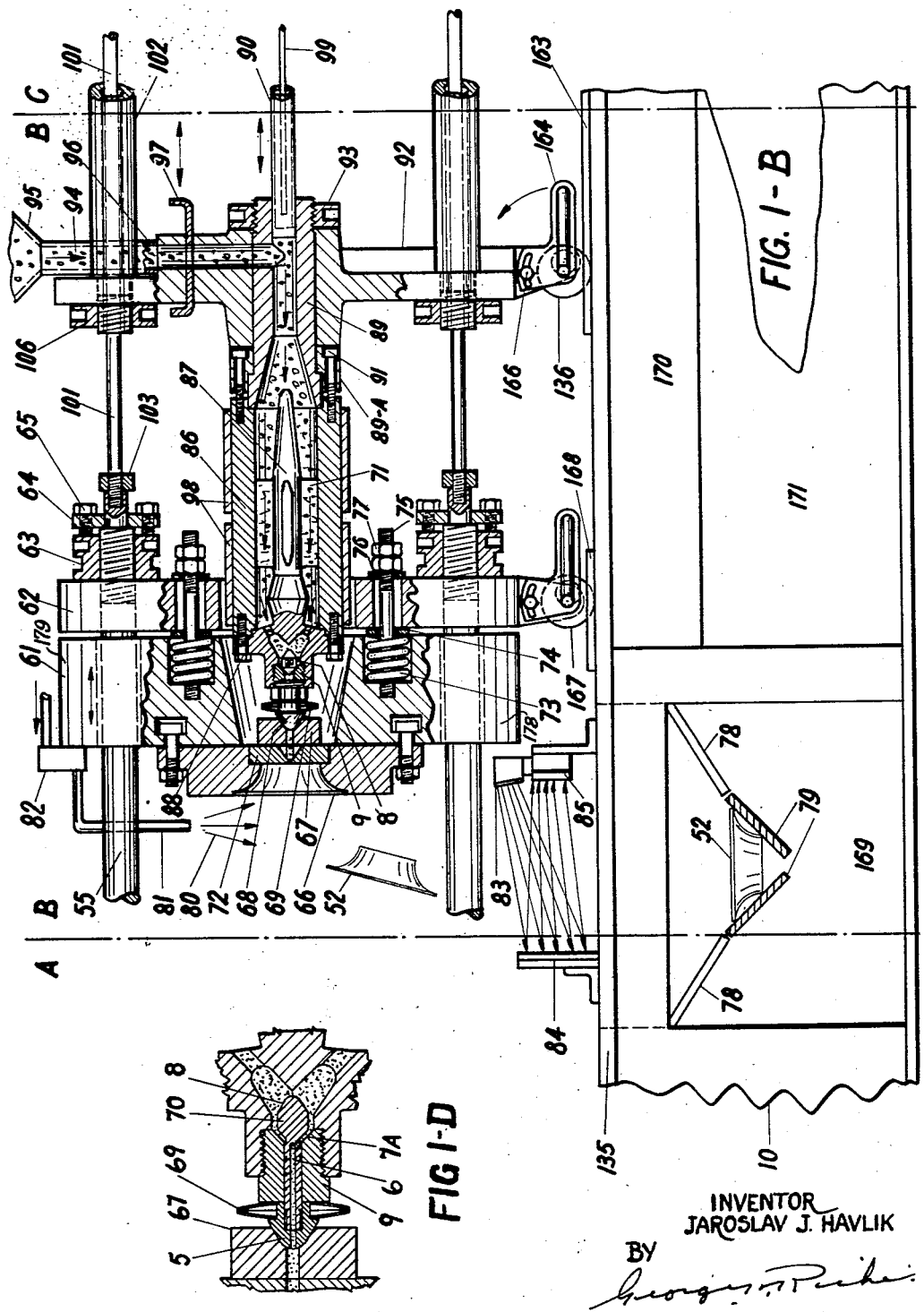

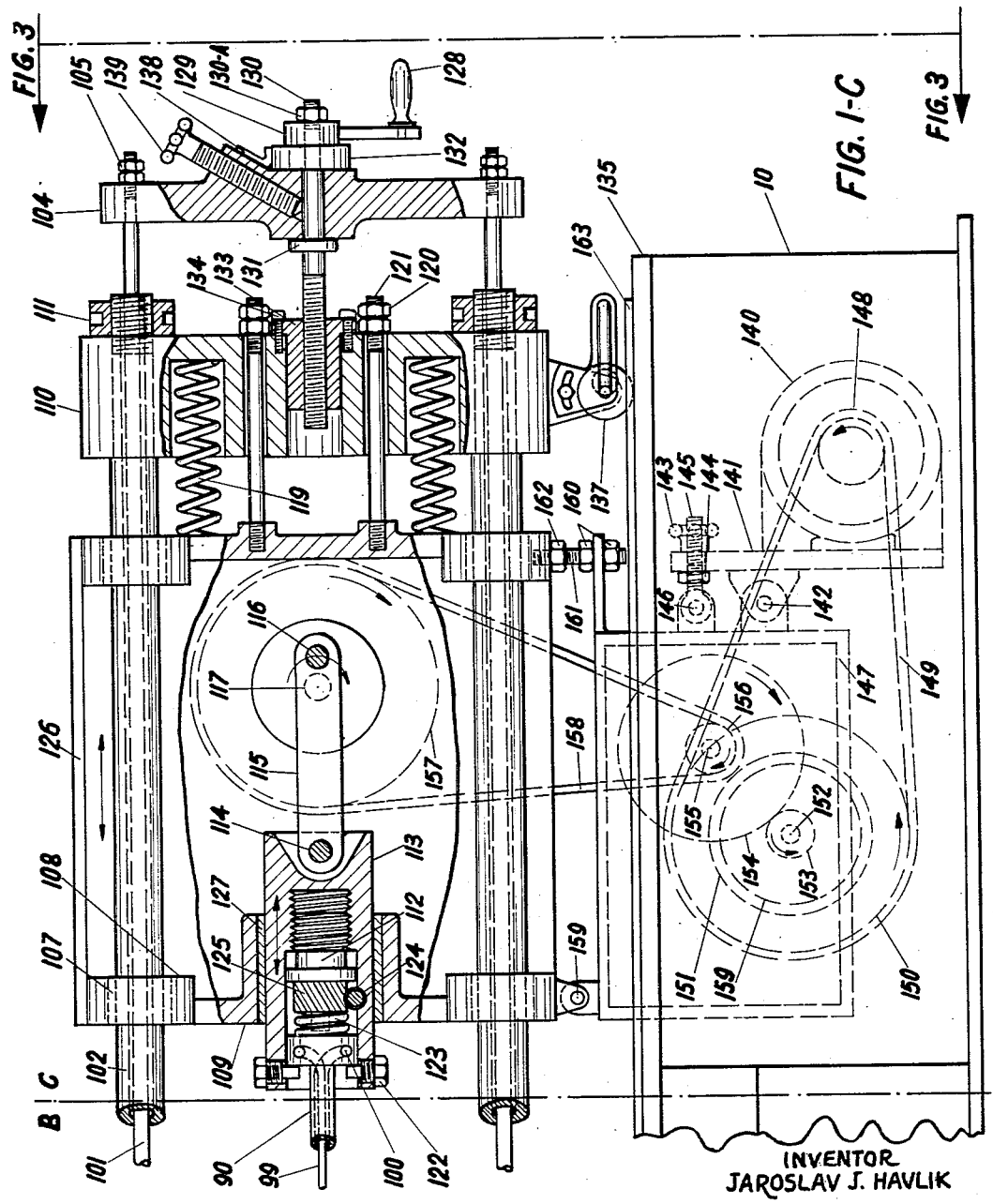

INVENTOR
JAROSLAV J. HAVLIK
BY
ATTORNEY

United States Patent Office 3,158,905
Patented Dec. 1, 1964

3,158,905
MECHANICAL INJECTION MOLDING MACHINE
Jaroslav J. Havlik, 952 Hamilton St.,
Preston, Ontario, Canada
Filed Jan. 19, 1962, Ser. No. 167,358
3 Claims. (Cl. 18—30)

This invention relates to a plastic injection molding machine and particularly to a mechanically actuated molding machine.

The plastic molding machine described, is particularly developed for producing throw-away plastic containers, lids, etc., at a high rate of speed, but it is not limited to this particular application, as by the changing of the molds, many articles can be made.

An object of the invention is to provide a machine or apparatus that will function at high speed continuously twenty-four hours of the day with very little shut-down time.

A further object is to provide a machine that constantly produces products of acceptable standards.

A further object is to provide a machine that requires very little adjusting while operating.

A further object is to provide a machine that can be quickly adjusted when required, both while operating and prior to operating.

A further object is to provide a machine that requires very little servicing, and when servicing is required, it can be done quickly and the machine put back into operation.

Other and further objects and advantages of the invention will be apparent from the following description.

The plastic molding machine of the present invention consists of:

(A) A mold clamping section actuated by a toggle connected to a crank driven by high efficiency gears and belt via a vari-speed pulley drive on an electric motor.

(B) A plasticizing and injection section actuated by a crank driven by a high efficiency chain, gears and belt drive via a vari-speed pulley drive on an electric motor.

Drives are provided with air or electrically operated clutches and brakes to provide instant starting and stopping of the injections and clamping sections while the motors run continuously.

Four tie-bars are used and the clamping and injection rams are centrally located to balance forces generated.

The mold clamping toggles, ram, ram guide and gear drive are contained within a heavy gear box and operated in an oil spray and the forces generated are confined to the box. The box is fixed to the machine frame and also serves as an anchor for one end of the main tie-bars. All other members and the other ends of the tie-bars float and are allowed to adjust their position as the clamping and molding forces cause deflections.

The injection crank, ram, ram guide and crank shaft are contained in a heavy crank case. An additional gear box with reduction gears are hung from the crank case in such a way that the chain connecting the two sprockets can be adjusted.

The plasticizing magazine and carrier is connected by four hollow main tie-bars to the spring cushion block and both ride on rolls on a track on the main machine frame. The forementioned crank case and gear box are carried on the four hollow tie-bars and are allowed to slide on them when the springs are caused to deflect by the injection force of the piston when pressurizing the plastic in the plasticizing magazine. The springs in the cushion block are pre-set to limit the pressure and are adjustable.

The smaller tie-bars within the hollow tie-bars carry only the forces required to engage the plasticizing magazine nozzle with the mold nozzle receptacle and the deflecting of the nozzle valve spring when the nozzle valve is opened.

An adjusting screw with a crank is provided that shifts the nozzle forward to engage it with the mold nozzle receptacle and open the nozzle valve while the mold is separated to allow purging of the plasticizing magazine.

When the adjusting screw is in the operating position, and the machine is operating normally, the stationary mold holder moves forward approximately 1/16″. As the mold closes and the mold nozzle receptacle engages the nozzle, this action opens the nozzle valve to allow pressurized plastic to enter the mold.

A purpose of the hollow tie-bars is to allow the nozzle to be easily aligned with the mold nozzle receptacle. This is accomplished by raising or lowering the wheels on the plasticizing magazine carrier, or moving them sideways, whichever is required.

The moving clamping mold platen is connected to the toggle ram by a large screw and nut which allows for clamping adjustment and for adjusting the space to accommodate different size molds. A lock is provided on the nut.

The stationary injection mold platen is made in two different sections; one section fixed to the main tie-bar ends, the other section allowed to slide on the main tie-bars. They are forced apart about 1/16″ by springs, and the distance is limited by a stud provided with a quick release washer. When the release washers are swung out of the way, the moving section can be slid back to separate it from the fixed section and expose the nozzle for servicing, etc. The fixed section of the injection platen can be adjusted slightly, by the nuts on the tie bars that are marked with a scale and provided with a lock, to ensure that its face is squarely presented to the moving section.

A stroke adjustment is provided for the injection piston by means of a screw turned by a worm and wheel in its slide. It can be adjusted while the machine is operating to vary the amount of plastic injected. The piston can be quickly removed for inspection, etc.

The plasticizing magazine is heated electrically by resistance strip heaters clamped to the outside and insulated to avoid influencing the temperature of the plastic by the ambient air. The heaters are divided into front and rear sections for better temperature control and each section has its own thermocouple and indicating thermostatic instrument to control the temperature of the plastic in the magazine.

The nozzle receptacle on the mold is heated by an electrical resistance heater and has its own variable rheostat control.

The injection piston and cylinder are water cooled to prevent melting of the plastic in this area. The back plate in the mold is water cooled to help chill the plastic quickly. The die cavity and core have water cooling to help chill the plastic and control the mold temperature.

The plasticizing magazine and torpedo are aranged to give the maximum heat transfer to the plastic so as to deliver it through the nozzle into the mold in the ideal state.

The core portion of the mold is provided with an ejection ring which is actuated by a knockout pin when the mold is opened. An air jet is provided that opens when the mold opens and hurries the molded article out of the way.

A photo-electric cell stops the machine if the cup is not ejected. A control is also provided that shuts the machine off if some foreign object prevents the mold from closing.

In normal operation the injection section of the machine operates continuously at a predetermined speed. Through limit switches actuated by the injection drive motion, relays are energized that actuate the brake and clutch on the drive of the clamping section to close the mold, dwell for a period while the injection is taking place and then open the mold to allow the molded article to be ejected.

The clutch and brake on the injection section are used to start and stop the piston at various positions while adjusting and setting up.

Controls are provided so that both sections can be adjusted in small increments to different positions and reversed to facilitate adjustments and setting up.

The main frame provides a support for the machine to carry the weight, but no operating forces are transfered to it.

The upper surface of the main frame has a track on which the supporting rolls run the space underneath in the center portion houses the electric controls. The space at the ends is taken up by the drive housings which can easily be removed for servicing or replacement.

Other and further features of the invention will be apparent from the following description and accompanying drawings, in which:

FIGURE 1-A is a side elevation of the mold clamping section showing the drive arrangement and with the portion between the tie-bars cut away to show the toggle arrangement and moving platen equipped with male part of a typical die. The tie-bar nuts are sectionalized.

FIGURE 1-B is a side elevation of the plasticizing and injection section with the portion between the tie-bars cut away to show the stationary clamping mold sections equipped with the female part of a typical die and the plasticizing and the injection arrangement. The tie-bar nuts are sectionalized.

FIGURE 1-C is a side elevation of the injection section of the machine showing the drive arrangement and with the portion between the tie-bars cut away to show the crank, the plunger adjustments and the spring cushion arrangements. The tie-bar nuts are sectionalized.

FIGURES 1-A, 1-B and 1-C form a complete side elevation of the machine.

FIGURE 1-D is an enlarged fragmentary cross-section of the injection nozzle and related parts to show its construction and operation.

Figure 2:
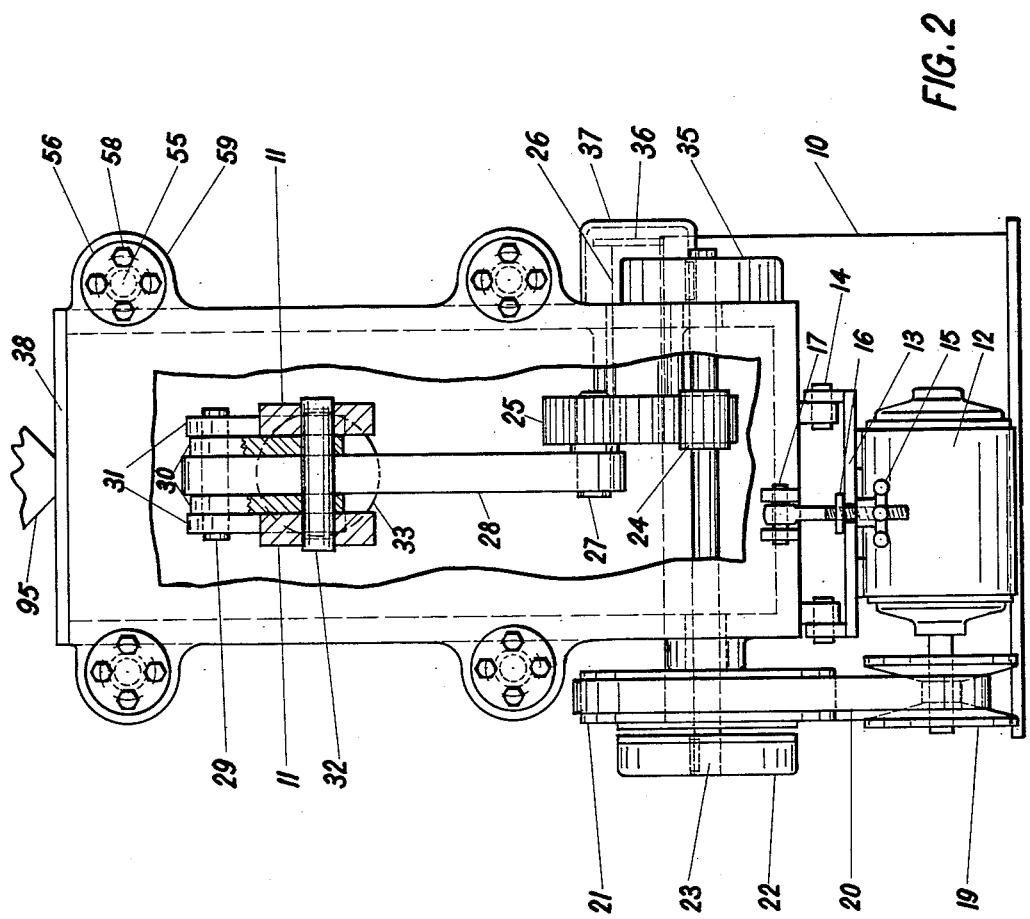
FIGURE 2 is an end elevation of the mold clamping end of the machine, looking in the direction of the arrows FIGURE 1-A showing the drive arrangement and with a center portion of the gear box cut away to show the gearing and toggles.
Figure 3:
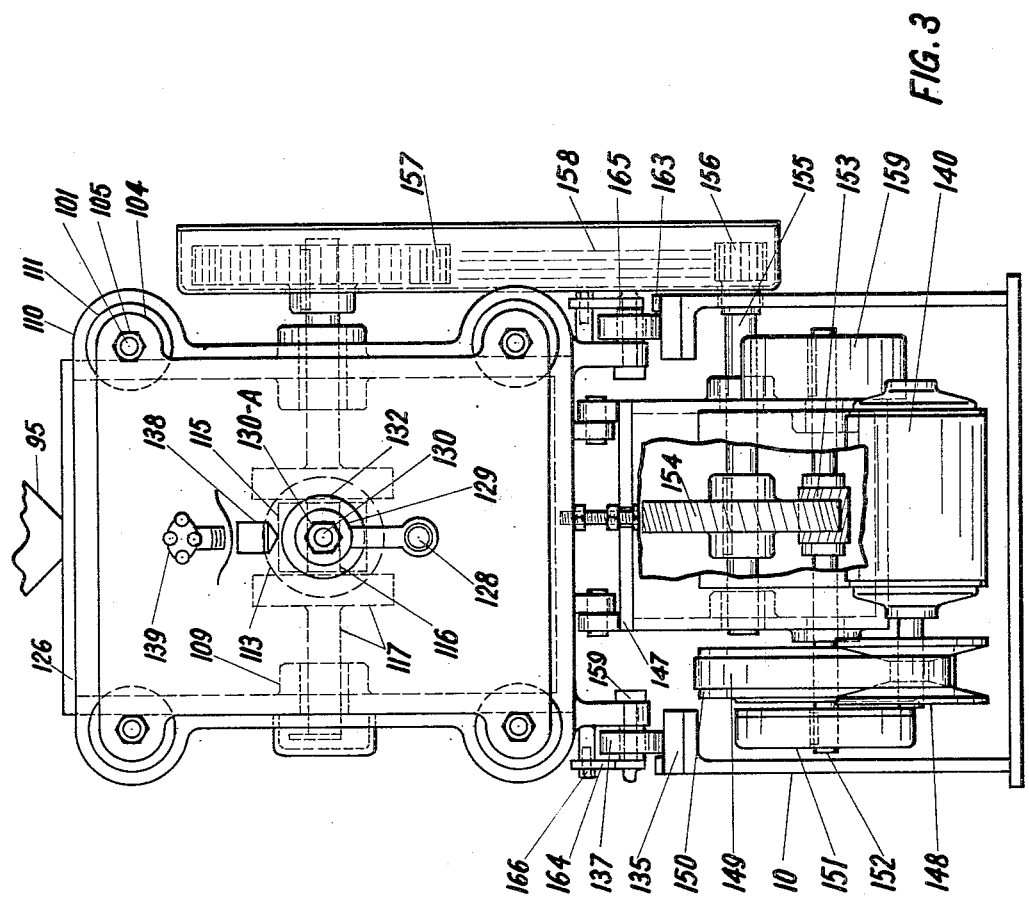
FIGURE 3 is an elevation of the opposite end of the machine, looking in the direction of the arrows, FIGURE 1-C showing the drive arrangements and with a portion of the gear box cut away to show the gearing.

Referring to the drawings and first of all particularly to FIGURES 1-A and 2, 10 is the main frame of the machine which carries all the weight; 11 is a gear box that is solidly fastened to the main frame 10. These two components of the machine may be considered stationary and all other components move or extend as the machine operates. The drive consists of motor 12 mounted on base 13 which can be pivoted on pin 14 by turning hand nut 15 and lock nut 16 along eye bolt 17 which is anchored by pin 18 to gear box 11. The reason for shifting the motor 12 is to allow the variable pitch pulley 19 to change its diameter and change the speed of the mold clamping portion of the machine.

Belt 20 drives a heavy pulley 21 which also serves as a flywheel. When the machine is operating normally, the motor 12, pulley 19, belt 20 and pulley 21, which turns freely on shaft 23, run continuously. When the mold is to be clamped or opened clutch 22 engages pulley 21 and drives shaft 23 to which it is keyed. Pinion 24, which is also keyed to shaft 23, drives gear 25 which is keyed to a jack shaft 26 that turns freely in its bearings. Gear 25 has a crank pin 27 which drives connecting rod 28 which is connected to toggles 30 and 31 by pin 29. Toggles 30 pivot on pin 32 which is anchored to gear box 11. Toggles 31 are connected to toggle slide 33 by pin 34.

Shaft 23 is keyed to brake 35 which quickly stops it and locks it in the desired position. Cams 36, which are fastened in an adjustable manner to jack shaft 26, actuate limit switches which are part of the control system. They are enclosed by cover 37. Gear box 11 has a removable cover 38. The toggle links 30 and 31 are shown in the open die position. When the die is closed, they are in line and form a lock.

Toggle ram 33 is guided in bushing 39. The threaded end 40 is screwed into adjusting nut 41 which fits into a socket in moving platen 42 where it is retained and locked by tightening screws 43 on split locking ring 44.

Platen mounting members are provided, which members consist of a pair of lower bosses 175, a pair of upper bosses 176 on the platen 42, a pair of lower bosses 178 and a pair of upper bosses 179 on the fixed section 61, said bosses having bearings through which the tie bars 55 pass.

This arrangement allows the distance between the platens to be adjusted to vary clamping pressure and also to accommodate different size molds. The male section of the mold 45 is clamped to the moving platen 42 by screws 46 and nuts 47. An ejection ring 48 has rods 49 passing through holes in the mold 45 and fixed to disc 50. When the platen 42 is in the open position as shown, the rod 51 engages the disc 50 and stops its movement. The mold 42 continues to travel to the position shown and the molded container 52 is forced off the male mold 45. The rod 51 is fixed to a cross bar 53 which bridges the hole that the toggle ram 33 slides through. The toggle ram 33 is hollow from the threaded end to the square cross hole 54 which the cross bar 53 passes through. The four main tie bars 55 are firmly fastened to the gear box 11 by the nuts 56 and are locked from turning and the thread is prevented from moving in the nuts 56 by locking disc 57 being forced against the end by the screws 58.

As clamping pressure is put on the tie bars 55 they stretch and being anchored to the gear box 11 by the lugs 59 they slide slightly through the lugs 60 and do not transmit any distorting stresses to the gear box 11 or the main frame 10. The main tie bars 55 also serve as guides for the moving platen 42 to slide on.

Referring particularly to FIGURE 1-B, it will be noted that the moving portion of the fixed platen 61 also slides slightly on the main tie bars 55 which serve as their guides.

The fixed portion of the fixed platen 62 is supported by adjustable rolls 167 which ride on track 135 and is firmly fastened to the end of the main tie-bars 55 by the nuts 63 which are locked by the ring 64 being pressed against the shoulder of the main tie-bars 55 by the screws 65. This arrangement allows the fixed platen 62 to be adjusted so the face is at right angles to the main tie bars 55.

In normal operation of the machine, the face of the male mold 45 and the face of the ejection ring 48 are moved and clamp up against the face of the female mold 66, the platen 61 in turn moves and is clamped against platen 62. This movement forces the mold nozzle receptacle 67 against the nozzle 68 and deflects the springs 69 and opens the valve 70 and allows pressurized plastic 71 to flow into the mold cavity. The valve 70 is slidably mounted in valve casing 9 carried on the end of the magazine 86 adjacent the platen 61. The rear end of the valve 70 is formed with a bullet shaped valve member 8 which seats against a valve seat 7 formed on the inlet side of the valve casing 9. The valve 7 has a passage 6 therethrough which is closed at the inlet end when the valve member 8 is seated. The other end is provided with a nose 5 which engages against the nozzle receptacle 67. The valve member is urged against the seat by a spring 69 mounted between the opposing faces of the nose 5 and the valve casing 9. The nozzle receptacle 67 is heated electrically by a resistance heater controlled by a variable resistor to allow the temperature to be set to the ideal value to prevent solidifying of the plastic in the opening into the mold cavity. The mold back plate 72, female mold 66 and male mold 45 are water cooled to quickly chill and solidify the plastic.

When the mold opens slightly, the spring 73 forces the platens 61 and 62 apart and the nozzle valve 70 closes, shutting off the flow of plastic 71. Washers 74, which slide on studs 75, which are fastened to platen 61, prevent spring 73 from entering the holes in platen 62. Swinging washers 76 and nuts 77 limit the distance that platens 61 and 62 are separated. The swinging washers 76 are swung out of the way and the nuts 77 pass through the holes provided in platen 62 allowing platen 61 to be slid down the main tie bars 55, thus allowing a wide separation to facilitate cleaning and adjusting nozzle 68 and nozzle receptacle 67.

When the machine is operating and when the plastic containers 52 are forced off the male mold 45, they fall downward through a hole in the top of the main frame 10 into a funnel 78 which directs it into slides 79 which allow it to move out of the machine. Instead of slides 79, a pair of moving belts can be arranged to convey the container 52 from the machine to any point desired.

An air blast 80 coming out of pipe 81 is directed to hurry the container out of the mold area. It is controlled by valve 82 which is actuated by and coincided with the opening of the mold.

Light source 83, mirrors 84 and photo-cell 85 are arranged to actuate the control system of the machine and stop it immediately if a container 52 does not pass through the light zone.

The plasticizing magazine 86 has a torpedo 87 within it arranged in such a way as to allow the plastic 71 to be thoroughly plasticized by a maximum of heating surfaces and at the same time offer a low resistance flow path.

The magazine 86 is heated electrically by two resistance heaters 98 each having their own temperature controls to allow changing the temperature as required and keeping it at the required setting.

The torpedo 87 is in one piece and is securely held in the hollow center of the magazine 86 by the screws 88. The nozzle 68 screws into the outlet end of the torpedo 87.

The inlet end of the magazine 86 is securely fastened to the injection cylinder 89 by the clamping ring 89A and the screws 91.

The injection cylinder 89 is held in the magazine carrier 92 and is securely clamped by the nut 93.

It will be noted that when the magazine carrier 92 is rolled back, the whole magazine assembly is exposed for easy removing and servicing.

The granular plastic material 94 is fed by gravity from hopper 95 through pipe 96 to the opening in the magazine carrier 92, to the inside of the injection cylinder 89 where it is forced into the magazine 86 and compressed with each stroke of the injection piston 90. These strokes are synchronized with the closing of the mold so that the plastic 71 will be pressurized when the mold closes, which action opens the nozzle valve 70.

The injection cylinder 89 and piston 90 are water cooled to prevent melting of the plastic 94 in this area and causing excessive friction between them. The injection piston 90 is cooled by passing water through the pipe 99 to the end of the hollow in the piston and then allowing the water to leave through the outlet 100.

The magazine carrier 92 is provided with a slide valve 97 to stop flowing of the granular plastic 94 when required.

Referring to FIGURES 1–B and 1–C, it will be noted that four inner tie bars 101 pass through four hollow tie bars 102 with considerable clearance between the inside diameter of the inner tie bar 101.

The reason for this arrangement is that the plasticizing magazine 86, injection cylinder 89, torpedo 87 and nozzle 68 are subjected to considerable heat and pressure which creates distortions and causes misalignment of the nozzle 68 with the recess in the nozzle receptacle 67. The vertical misalignment can be corrected by raising or lowering wheels 136. The horizontal misalignment can be corrected by shifting the track guide 163 sideways.

The wheels 136 are raised or lowered by turning handle 164 which is fastened to eccentric shaft 165 which is hollow and turns on pin 159. The handle 164 is locked in position by screw 166.

It will be noted that the cushion block 110 also can be adjusted in a like manner by rolls 137. Fixed platen 62 can also be adjusted in a like manner by rolls 167, which have their own side track guides 168.

Inner tie bars 101 are screwed into the end of the main tie bars 55 and are securely locked with the nuts 103. The other end of the inner tie bars 101 are securely fastened to the pressure plate 104 by the nuts 105 which force it against the shoulders provided.

Hollow tie bars 102 are securely fastened to the magazine carrier 92 by the nuts 106 which force it against the shoulders provided. The hollow tie bars 102 pass through bushings 107 provided in the lugs 108 in crank case 109 and are securely fastened to spring cushion block 110 by nuts 111 forcing it against the shoulders provided.

When the machine is operating normally and when the piston 90 is feeding and pressurizing the plastic 71 and 94 the reactive forces are transmitted through the following connecting parts: piston 90, to the adjusting screw 112, to the injection ram 113, to the pin 114, to the connecting rod 115, to the crank shaft pin 116 through the crank shaft 117 to the crank case 109. The reaction is then transmitted through the coil springs 119 to the spring cushion block 110. The hollow tie bars 102 confine the forces between the cushion block 110 and the magazine carrier 92.

If the injection forces exceed the pre-set pressure of compression springs 119, the springs compress allowing the crank case 109 to slide on the tie bars 102 and equalize the forces.

The pre-set pressure of compression springs 119 can be adjusted by turning the nuts 120 on the studs 121 which are fastened to crank case 109. These studs 121 also limit the separation of the crank case 109 and the spring cushion block 110. It will be noted that stretching in the tie bars 102 has no adverse reaction to the crank case 109 and main frame 10.

It will be noted that the large end of the injection piston 90 is allowed to slide between the screw ends 122 and the end of the adjusting screw 112 which is within the spring 123.

This arrangement allows the effective stroke of injection piston 90 to be varied and thus vary the amount of granular plastic 94 being fed into the plasticizing magazine 86.

A slight clearance is provided between the outside diameter of the large end of the injection piston 90 and the inside diameter of the hollow injection ram 113 to allow the injection piston 90 to float and thus avoid breakage due to misalignment between it and the cylinder 89. The stroke adjustment is made by turning the worm 124 which is provided with a handle (not shown) and which engages worm wheel 125, which is part of the adjusting screw 112. This adjustment can be made while the machine is operating. The injection piston 90 can easily be removed for replacement or servicing by removing screws 122.

The crank case 109 has a removable cover 126. The injection ram 113 slides in the bushing 127 provided for it.

When the crank 128, which has its hub 129 keyed and firmly fixed to the adjusting screw 130 by the nut 130A is turned, the adjusting screw 130 turns freely in the pressure plate 104, and is held from shifting longitudinally by the shoulder 131 on one side and the disc 132, which also serves as an indicator dial, on the other side.

The threaded end of the adjusting screw 130 threads into the nut 133 which is firmly fixed to the spring cushion block 110 by screw 134.

When the screw 130 is turned, the whole assembly that is fastened to or is resting on the hollow tie-bars 102 rolls along the two tracks 135 on the main frame 10, on pairs of wheels 136 and 137, and thus longitudinal relationship of the nozzle 68 to the nozzle receptacle 72 is adjusted.

This convenient adjustable feature is used to adjust the setting of the opening and closing of the nozzle valve 70 during normal operation.

The adjusting screw 130 is also used to urge the magazine 86 of overheated plastic 71 by forcing the nozzle 68 against the nozzle receptacle 72 and deflecting the springs 69 and opening the nozzle valve 70 while the mold is in the open stationary position and the injection piston 90 is operating and pumping the new plastic 94 into the magazine 86 and forcing out the overheated plastic 71.

The adjusting screw 130 is also used to withdraw the nozzle 68, torpedo 87 end and magazine 86, from the encircling hollow in the platens 61 and 62, so they are exposed and can be serviced or replaced.

Indicator pointer 138 allows the adjusting screw 130 to be adjusted micromatically and returned to its original position after a major adjustment.

Handscrew 139 locks the adjusting screw 130 in the position it is set.

The drive on the injection portion of the machine consists of a motor 140 mounted on a base 141 which can be pivoted on pins 142 by turning the hand nut 143 and locknut 144 along eye bolt 145 which is anchored by a pin 146 to gear box 147.

The reason for shifting the motor 140 is to allow the variable pitch pulley 148 to change its diameter and thereby change the speed of the injection portion of the machine.

Belt 149 drives a heavy pulley 150 which also serves as a flywheel.

When the machine is operating normally, the turning pulley 150 is engaged with clutch 151 which is keyed to shaft 152 and which has pinion 153 keyed on it and which drives gear 154 which is keyed to its shaft 155 and which has chain sprocket 156 keyed to it and which drives chain sprocket 157 by chain 158.

Chain sprocket 157 is keyed to crank shaft 117.

The turning crankpin 116 imparts a reciprocating motion to connecting rod 115 and injection ram 113 through connecting pin 114.

The brake 159 keyed to the shaft 152 is disengaged during normal operation and is only used for set-up and adjusting purposes, at which time the pulley 150 is disengaged from the clutch 151 and turns freely on shaft 152.

The gear box 147 is hung from the crankcase 109 by the two pins 159.

The chain 158 is adjusted by raising or lowering the opposite end of the gear box 147 by turning the nuts 160 on the threaded stud 161 which is threaded into crankcase 109 and locked by nut 162.

Referring to the main base 10, area 169 is a tunnel to allow removal of the molded articles.

Area 170 contains the operating controls, and area 171 contains the auxiliary apparatus and controls.

No claims are being made on the electrical and mechanical control arrangements, therefore, no details or wiring diagrams are shown.

The embodiments of the invention in which an exclusive property or privilege is claimed are defined as follows:

1. In a high speed injection moulding machine of the type having a main frame, a movable platen section, a substantially fixed platen section mounted on horizontally extending bars, the bars being supported at one end by a platen operating mechanism housing fixed on the main frame and secured at the other end to a fixed pressure plate supported by the main frame, plastic injection mechanism comprising, in combination:
    (a) a plasticizing magazine supported in a substantially fixed operative position on said bars and having a portion extending through said fixed platen section for operative registration with a die member mounted on the fixed platen section and having a nozzle valve automatically opened when the platens close,
    (b) a reciprocable crankcase mounted on the bars between the magazine and the pressure plate;
    (c) a pressurizing and injection piston operatively positioned in said magazine;
    (d) a piston reciprocating member carried by the crankcase and operatively connected to the pressurizing and injection piston;
    (e) and power spring means between the reciprocable crankcase and the pressure plate storing piston reaction forces produced by filling and pressurizing the magazine with plasticized material, said power spring means automatically actuating the crankcase and the piston to effect an injection stroke upon opening the nozzle valve.

2. A plastic injection mechanism as defined in claim 1 and further including a cushion block mounted between the crank-case and the pressure plate and adjustably connected to said pressure plate; said spring means being mounted in said cushion block and extending therefrom into biasing contact with said crank-case.

3. A plastic injection mechanism as defined in claim 2 and further including spring pressure adjusting means.

References Cited in the file of this patent

UNITED STATES PATENTS

| | | |
|---|---|---|
| 1,922,937 | Eckert | Aug. 15, 1933 |
| 2,233,354 | Thilenius | Feb. 25, 1941 |
| 2,498,264 | Goldhard | Feb. 21, 1950 |
| 2,711,567 | Knapp | June 28, 1955 |

FOREIGN PATENTS

| | | |
|---|---|---|
| 1,030,255 | France | Mar. 11, 1953 |
| 1,145,554 | France | May 6, 1957 |
| 1,039,201 | Germany | Sept. 18, 1958 |